J. R. STAFFORD.
Grain Drier.
No. 5,524.
Patented April 18, 1848.
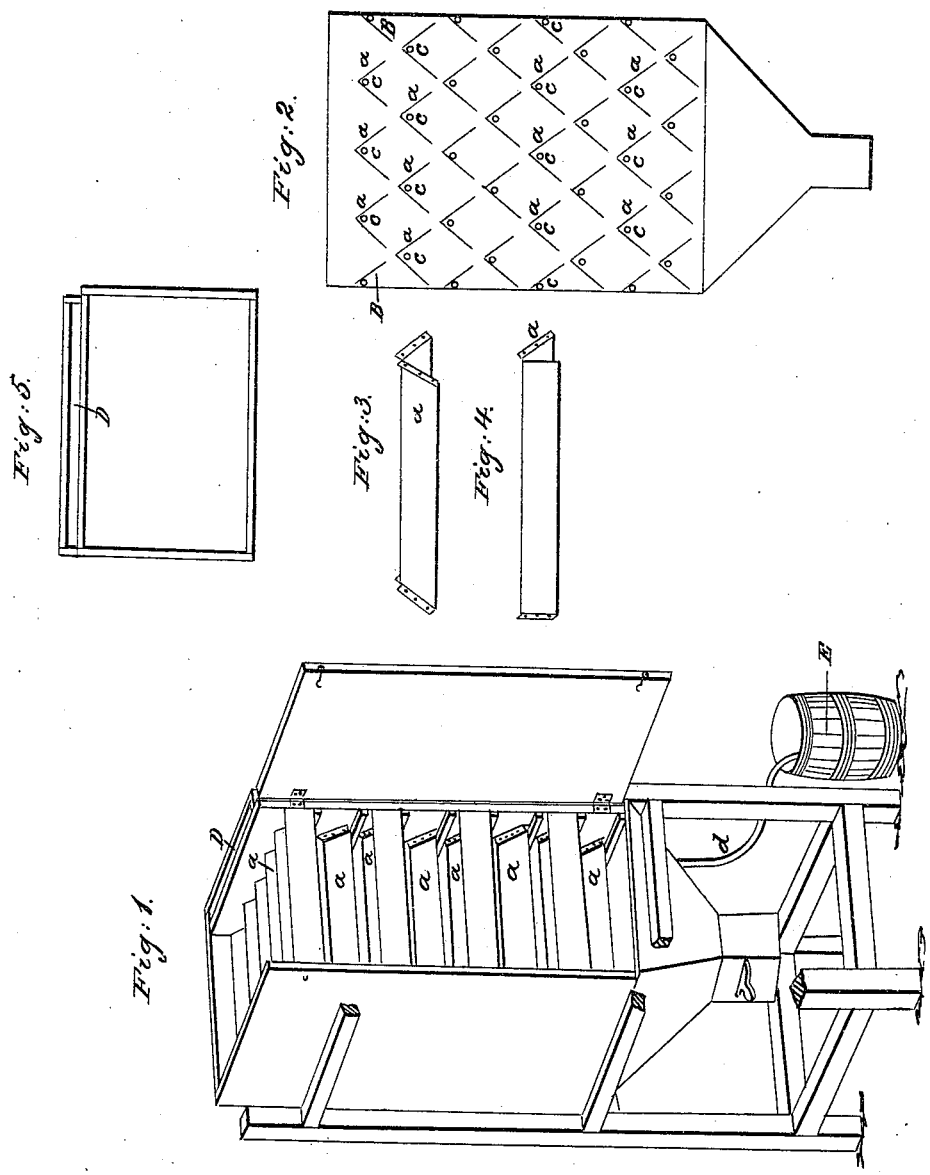

UNITED STATES PATENT OFFICE.

JAMES R. STAFFORD, OF CLEVELAND, OHIO.

GRAIN-DRIER.

Specification of Letters Patent No. 5,524, dated April 18, 1848.

*To all whom it may concern:*

Be it known that I, JAMES R. STAFFORD, of Cleveland, in the county of Cuyahoga and State of Ohio, have invented a new and Improved Mode of Ventilating Grain; and I do hereby declare the following to be a full, clear, and exact description thereof, reference being had to the accompanying drawing, making a part of this specification.

The importance of artificially expelling the moisture from certain kinds of grain, prior to its exportation is with the experienced no longer controvertible. For many years past in some of the Atlantic States, the business of drying Indian corn, preparatory to grinding the same for shipment to the West Indies, and South America, has been carried to a large extent. This has usually been done with machines termed driers. The different kinds of grain that has been subjected to this process is mostly of the denser sort, which requires comparatively a long application of heat, to expel its internal moisture, consequently the machines heretofore used for this purpose, are more appropriately termed heaters than driers as they are usually heated by the direct action of fire, or hot air generated by fire, and the grain can only be heated not dried by them. For if the grain was permitted to remain upon the heater a length of time sufficient to dry it, or in contact with any heating surface, or in a situation when heated air should be brought in contact with the grain until all the moisture was expelled but a small quantity could be passed over a heater or through any machine, in the course of a day, and the process would be too tedious. After the grain has passed over, or through the heater it is usually spouted in a pile, when the heat it has imbibed, disengages the moisture, forcing it up through the mass, and in its passage scalding a large portion of the grain, destroying the gluten, and greatly diminishing its nutritive properties, while a large part of the moisture thus disengaged, condenses, and remains in the grain to be reabsorbed. Oftentimes sufficient moisture remains in the grain after it has been thus treated to generate fermentation when exposed to the heat of a northern midsummer, or a tropical climate, so that the whole process is at best uncertain, and the object sought of expelling the moisture from the grain is defeated by the very operation itself, being imperfect, and unphilosophical.

Grain from its natural moisture often becomes heated in warm or damp weather when stored in quantities and allowed to remain undisturbed for any length of time. To preserve it, it requires ventilation. The usual mode is to move it with shovels, which from the necessity of the case, is commonly done in haste, and in an imperfect manner. It being thus moved in masses, the ventilation is imperfect, consequently the greater portion of the moisture condenses, remaining in the grain, is reabsorbed, and the evil not remedied.

To remedy similar evils for the future, the undersigned has invented a process of ventilation, the use of which will permit the moisture expelled by the internal heat of the grain, (whether caused artificially or otherwise) to readily pass off without subjecting the grain to the condensing action of the atmosphere during the process of ventilation.

The nature of my invention consists, in causing the heated grain to descend by its own weight, or gravity, through a column which is furnished with a series of double inclined planes, so arranged that the vapor disengaged is conveyed off through apertures provided for that purpose.

To enable others skilled in the art to make and use my invention, I will proceed to describe its construction, and operation, reference being had to the annexed drawings making a part of this specification.

Figure 1, represents a perpendicular column which should be made of boards or plank secured by a suitable frame work upon the outside. The interior dimensions are usually six feet by four feet and from ten to twenty feet high to suit the situation in which it is to be located and the amount of grain that is required to be acted on. The bottom of this column is formed like a hopper, terminating in a spout which is furnished with a slide to regulate the descent of the grain, when a larger amount of grain requires to be ventilated than can be done in a column of the size described, the length of the column may be increased with partitions running perpendicularly with the height of the column, and each division terminating in a hopper as described. The upright portion of the column is supplied with a series of double inclined planes arranged in series one above another, crossing the column in the shortest diameter as shown in Fig. 1, *a, a,* the ends resting upon the sides on ledges, or in any convenient manner.

Fig. 2, *a, a, a,* &c., shows the order in which these series are arranged, the terminating angle of one plane being above the apex of the series next immediately below. The inclined planes may be made of metal, or of wood. When made of metal they should be covered with wood so as to make their surfaces poor conductors of heat and thus prevent the condensation of the rising vapor.

Fig. 3, represents in perspective view one of the double inclined planes, and Fig. 4 a half or single one, two of which are necessary to be used at each alternate series as shown at B B, Fig. 2, all the others are double. These inclined planes are placed in ledges as above described, and one side of the column made to open as shown in Fig. 1, for the purpose of removing, changing, or repairing any part of the interior structure if necessary. Upon one side of the column Fig. 1 is an air chamber, reaching from the bottom to the top, the opening in the top being shown at D, the bottom being closed, and from which a pipe D, Fig. 1, leads into a vessel E, Fig. 1, containing water, the lower end of the pipe terminating below the surface of the water, for the purpose of preventing the ascent of a current of air through the pipe into the air chamber. The use of this pipe is to convey off any water that might accumulate by the condensing of the vapor thrown off by the heated grain.

There is a communication from the interior surface of each double inclined plane *a,* into this air chamber (D Fig. 1) as shown at *c c c c,* &c., in Fig. 2, and the vapor arising from the heated grain as it slowly descends from the upper or exterior surface of the inclined planes, is arrested in its ascent by the interior surfaces of the double inclined planes, passed through the aperture C C C C &c Fig. 2, into the air chamber D Fig. 1, where it escapes into the open air; or is conveyed off by a pipe as most convenient.

Fig. 5 shows a bird's eye view of the top of the column, with the chamber D attached. The grain descending by its own gravity, is kept constantly in motion for several hours, and all the time presenting a vast surface favoring a free evaporation of the moisture disengaged by the action of the heat. I sometimes construct the interior of the column with half round pipes, or any other device by which the object specified shall be accomplished.

What I claim as my invention, and desire to secure by Letters Patent, is—

The manner of ventilating, or heating, and drying grain, malt, &c., by passing it through a casing or chamber by its own gravity among a series of inclined planes, arches, semi-cylinders, or other analagous devices, arranged within the chamber, and combined with each other and with ventilating apertures in the sides of the chamber, substantially as herein described and represented; the grain or other substance being exposed to a large extent of surface while descending through the chamber, and afforded at all parts of the descending column an opportunity to freely discharge and throw off the moisture disengaged therefrom.

JAMES R. STAFFORD.

Witnesses:
 ALLEN SMITH, Jr.,
 C. M. GIDINGS.